United States Patent [19]

Mergler

[11] Patent Number: 5,505,545
[45] Date of Patent: Apr. 9, 1996

[54] SLIDING BEARING

[75] Inventor: Wolfgang Mergler, Düren, Germany

[73] Assignee: Igus Spritzgussteile für die Industrie GmbH, Köln, Germany

[21] Appl. No.: 313,238

[22] PCT Filed: Mar. 30, 1993

[86] PCT No.: PCT/DE93/00294

§ 371 Date: Oct. 3, 1994

§ 102(e) Date: Oct. 3, 1994

[87] PCT Pub. No.: WO93/20364

PCT Pub. Date: Oct. 14, 1993

[30] Foreign Application Priority Data

Apr. 1, 1992 [DE] Germany .......................... 42 10 681.8

[51] Int. Cl.⁶ ........................................ F16C 27/02
[52] U.S. Cl. ..................... 384/215; 384/276; 384/295
[58] Field of Search .................... 384/26, 29, 192, 384/202, 215, 220, 222, 276, 295, 125

[56] References Cited

U.S. PATENT DOCUMENTS

| | | | |
|---|---|---|---|
| 2,831,737 | 4/1958 | Jacoby . | |
| 2,936,141 | 5/1960 | Rapata | 384/215 X |
| 3,333,513 | 8/1967 | Wettstein | 384/29 X |
| 3,679,276 | 7/1972 | Stenlund | 384/295 |
| 3,829,184 | 8/1974 | Chevret | 384/220 X |
| 3,929,392 | 12/1975 | Ogino | 384/215 |
| 3,936,101 | 2/1976 | McDonald | 384/222 |
| 4,090,746 | 5/1978 | Harkins et al. | 384/125 |
| 4,208,075 | 6/1980 | Templeton | 384/29 |
| 4,790,672 | 12/1988 | Komplin | 384/125 |

FOREIGN PATENT DOCUMENTS

| | | |
|---|---|---|
| 0192531 | 8/1986 | European Pat. Off. . |
| 2217585 | 9/1974 | France . |
| 1400328 | 10/1968 | Germany . |
| 1803413 | 5/1969 | Germany . |
| 2916798 | 10/1980 | Germany . |
| 8619907 | 10/1986 | Germany . |

OTHER PUBLICATIONS

Louis Halberstadt, "Polyurethane Bearings", in Machine Design, Jun. 1963, pp. 151, 152.
Patent Abstract of Japan, Sliding Bearing, JP 1-216121 (A) M-898 Nov. 24, 1989 vol. 13/No. 528.

Primary Examiner—Thomas R. Hannon
Attorney, Agent, or Firm—Browdy and Neimark

[57] ABSTRACT

A sliding bearing (1) made of plastic has a separate press-fit area (2) and sliding area (3). The sliding area (3) is divided into individual segments, so that it only partially contacts a shaft mounted in it. The segmented sliding area (3) has a smaller inside diameter than the press-fit area (2), and the press-fit area (2) has a larger outside diameter than the sliding area (3). The sliding bearing (1) according to the invention permits virtually clearance-free shaft mounting, where the effects of moisture and temperature have absolutely no influence on the running properties of the bearing.

4 Claims, 1 Drawing Sheet

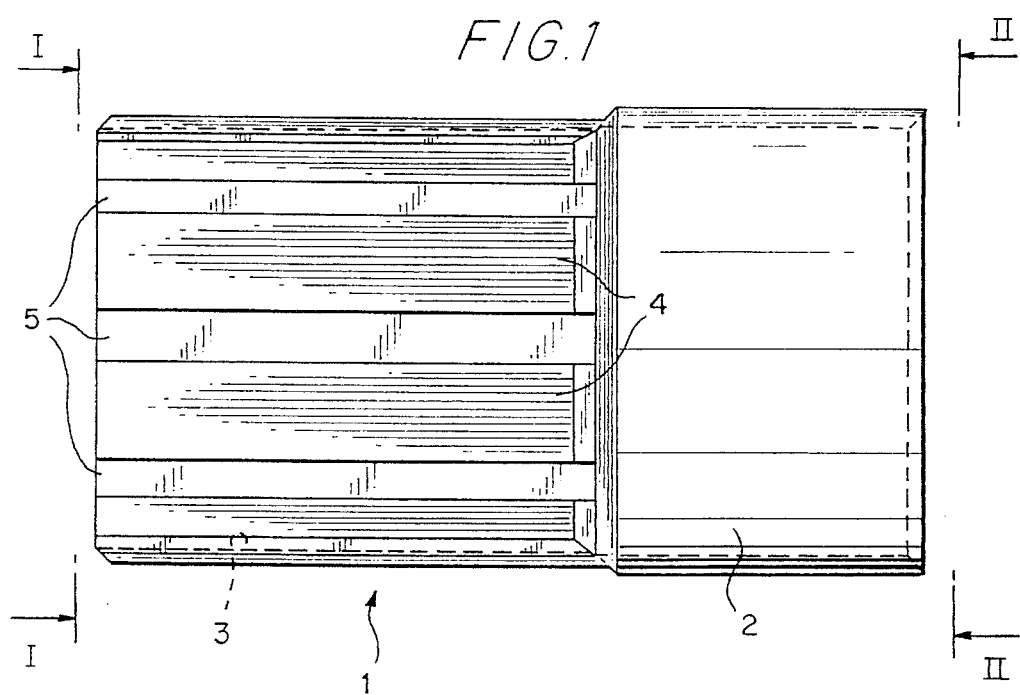
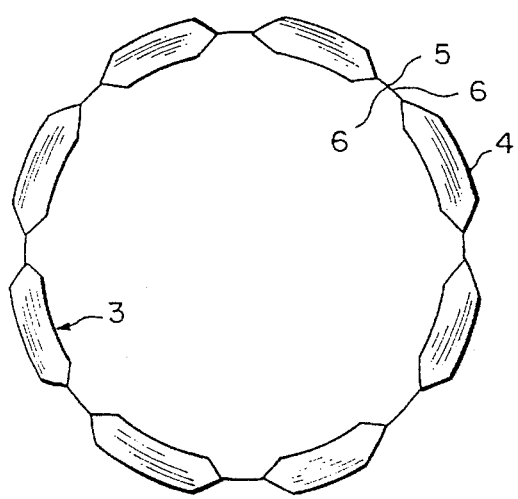
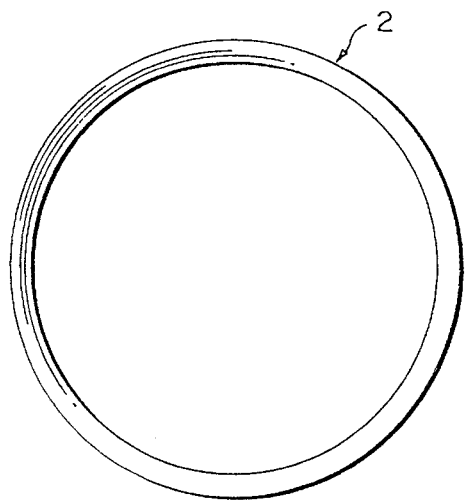

SLIDING BEARING

The invention concerns a sliding bearing, essentially consisting of a plastic sleeve, which has a separate press-fit area and sliding area, where the sliding area has a smaller inside diameter than the press-fit area, and the press-fit area has a larger outside diameter than the sliding area.

Sliding bearings of this kind are essentially used in situations where good sliding properties with low-noise running and low wear are desired. Above all, sliding bearings made of plastic are corrosion-resistant, generate little noise, are extremely abrasion-resistant and can be lubricated with oil, grease, emulsions or even water. They are generally press-fitted into steel bushes or directly in the bearing seat.

Due to the fact that the plastics used for these bearings, such as polyamide, have a coefficient of thermal expansion which is approximately 10 times higher than that of metals, and are also hygroscopic, the use of plastic sliding bearings results in very large tolerances. This means that plastic bearings expand considerably during operation due to their hygroscopicity and their high coefficient of thermal expansion. In order to avoid the bearing from seizing, use of this type of bearing requires a clearance larger than that of sliding bearings made of metal. This is considered to be very unfavourable, particularly in situations where very small tolerances are required.

A type of sliding bearing of this kind is known from U.S. Pat. No. 4,208,075, for example. The sliding bearing described there is primarily designed for linear movements. It consists of a teflon sleeve divided into segments on both sides, where the individual segments protrude alternately inward and outward. The sliding area of the bearing is formed by collar-like projections protruding into the sleeve. The press-fit area of the bearing, i.e. the outer surface of the sleeve, is designed for a specially shaped bearing seat. For this purpose, the outer segments also have collar-like extensions projecting outward, which grip and snap into a groove in the bearing seat. The inward-protruding projections form a clearance region between the inner surface of the sleeve and the shaft, and the outward-protruding projections form a clearance between the outer surface of the sleeve and the bearing seat. The sliding area and press-fit area are separated from one another in the radial direction.

The task of the present invention is to create a sliding bearing made of plastic with improved running properties which requires substantially less clearance than conventional plastic sliding bearings.

In accordance with the invention, this task is solved in that the press-fit area and the sliding area are offset in the axial direction and axially separated from one another, the press-fit area has an outside diameter roughly equal to the inside diameter of the bearing seat, and the sliding area is formed by webs essentially extending in the axial direction, which rest against the shaft and are interconnected in continuous fashion by a thin, flexible film in the axial direction.

The sliding bearing according to the invention permits virtually clearance-free shaft mounting, where the effects of moisture and temperature have absolutely no influence on the running properties of the bearing. This is achieved through the separation of the retaining and sliding tasks, and through the segmented division of the sliding area. The expansion of the bearing material due to moisture and temperature can be compensated for by the segmented division of the sliding area. This means that material expansion in the radial direction can be distributed in the circumferential direction of the sliding bearing. In addition, the sliding bearing according to the invention requires little maintenance, i.e. no lubricant whatsoever is required. This guarantees the stability of the bearing, particulary during linear movements. The continuous interconnection of the webs via a flexible, thin film reliably prevents the webs from being forced apart or twisted when the bearing is subjected to great loads. The film is expediently moulded onto the edges of the webs in such a way that the inner and also outer periphery of the sliding area has indentations. Sufficient space is thus available for the film to unfold in the peripheral direction in the event of expansion of the webs. In addition, abraded material from the bearing and lubricant can collect in the indentations facing the shaft. Abraded material is generated on sliding bearings made of plastic when the shaft first runs in on the bearing, and when the bearing first runs in on the shaft. Dirt and corrosion from the shaft also collect in the indentations, thus reliably preventing the shaft from seizing, despite the low-clearance of the bearing.

In the case of larger sliding bearings, several press-fit and sliding areas mutually separated from one another can be combined in a variety of arrangements.

An example of the invention is described based on the drawings and explained in detail below.

The figures show the following:

FIG. 1 A lateral view of a sliding bearing according to the invention;

FIG. 2 A top view of the sliding bearing in the direction of arrow I in FIG. 1 and FIG. 3 A top view of the sliding bearing in the direction of arrow II in FIG. 1.

As the drawing illustrates, sliding bearing 1 consists of a sleeve with two different areas having different inside and outside diameters. The outside diameter of press-fit area 2 is matched to a bearing seat. This is the only area of sliding bearing 1 which is pressed firmly into the bearing seat. Accordingly, a smaller outside diameter is selected for sliding area 3.

The inside diameter of sliding area 3 is smaller than the inside diameter of press-fit area 2, so that a shaft running in sliding bearing 1 is only borne in sliding area 3. As a result, the retaining function and sliding function are assigned to two different areas of sliding bearing 1.

As is most clearly illustrated in FIG. 2, sliding area 3 is divided by webs 4 essentially extending in the axial direction. Other designs are also conceivable, such as spiral-shaped divisions or two press-fit areas located on the outer ends of the bearing, for example. Material expansions can be compensated for by the division of sliding area 3 into webs 4. For reasons of stability, webs 4 are interconnected in continuous fashion by flexible, thin film bridges 5. In this context, film bridges 5 are connected to webs 4 in such a way that the inner and outer periphery of sliding bearing 1 has indentations 6.

| Reference numbers | |
|---|---|
| 1 | Sliding bearing |
| 2 | Press-fit area |
| 3 | Sliding area |
| 4 | Webs |
| 5 | Film bridges |
| 6 | Indentations |

I claim:

1. A sliding bearing, to be press-fit in a bearing seat for supporting a shaft, the bearing having an axial direction, the bearing comprising:

a plastic sleeve including a press-fit area (2), for press-fitting the bearing in the bearing seat, and a sliding area (3) separate from the press-fit area, for sliding the bearing relative to the shaft;

the press-fit area and the sliding area being contiguous and offset along the axial direction;

the sliding area being formed by webs (4), extending substantially in the axial direction, which rest against the shaft and are continuously interconnected by a thin, flexible film extending substantially in the axial direction;

a press-fit area outside diameter being larger than a sliding area outside diameter;

the press-fit area outside diameter being roughly equal to a bearing seat inside diameter; and a sliding area inside diameter being smaller than a press-fit area inside diameter.

2. The bearing according to claim 1, comprising a plurality of press-fit areas and sliding areas pairwise contiguous and mutually offset from one another along the axial direction.

3. The bearing according to claim 1, wherein the film is molded onto edges of the web such that indentations (6) are formed on both an inner periphery and on an outer periphery of the sliding area.

4. The bearing according to claim 3, comprising a plurality of press-fit areas and sliding areas pairwise contiguous and mutually offset from one another along the axial direction.

* * * * *